(12) United States Patent
Kuzhiyil et al.

(10) Patent No.: US 8,495,193 B2
(45) Date of Patent: Jul. 23, 2013

(54) CENTRALIZED MANAGEMENT TOOL FOR REMOTE PRESENTATION SESSION SERVER FARMS

(75) Inventors: Rishad Madhura Kuzhiyil, Hyderabad (IN); Peeyush Gandhi, Hyderabad (IN); Nagarjun Guraja, Hyderabad (IN); Rajesh Ravindranath, Hyderabad (IN); Jaideep Ganguly, Hyderabad (IN); Sudarshan Yadav, Hyderabad (IN); Shanmugam Kulandaivel, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 12/711,222

(22) Filed: Feb. 23, 2010

(65) Prior Publication Data

US 2011/0208804 A1 Aug. 25, 2011

(51) Int. Cl.
*G06F 15/173* (2006.01)
(52) U.S. Cl.
USPC .......................................... 709/223; 709/224
(58) Field of Classification Search
USPC .............. 709/223, 224, 220, 227, 229; 718/1, 718/104, 105, 106
See application file for complete search history.

(56) References Cited

U.S. PATENT DOCUMENTS

| | | | | |
|---|---|---|---|---|
| 6,922,724 | B1 * | 7/2005 | Freeman et al. | 709/223 |
| 2001/0049717 | A1 * | 12/2001 | Freeman et al. | 709/203 |
| 2003/0154290 | A1 * | 8/2003 | Moon et al. | 709/228 |
| 2006/0218285 | A1 | 9/2006 | Talwar et al. | |
| 2006/0230156 | A1 | 10/2006 | Shappir et al. | |
| 2007/0005732 | A1 * | 1/2007 | Bankston et al. | 709/219 |
| 2007/0198656 | A1 | 8/2007 | Mazzaferri et al. | |
| 2007/0244920 | A1 * | 10/2007 | Palliyil et al. | 707/102 |
| 2008/0030764 | A1 * | 2/2008 | Zhu et al. | 358/1.15 |
| 2008/0263148 | A1 * | 10/2008 | Mace et al. | 709/203 |
| 2009/0113414 | A1 | 4/2009 | Hamilton | |
| 2009/0187654 | A1 * | 7/2009 | Raja et al. | 709/224 |
| 2009/0235342 | A1 | 9/2009 | Manion et al. | |

OTHER PUBLICATIONS

"Remote Desktop Services (Terminal Services) Team Blog," *Microsoft Corporation*, Dec. 15, 2009, 9 pgs, downloaded Jan. 8, 2010, http://blogs.msdn.com/rds/.

(Continued)

*Primary Examiner* — Lashonda Jacobs
(74) *Attorney, Agent, or Firm* — Woodcock Washburn, LLP (57) ABSTRACT

Systems, methods, and computer-readable storage media are disclosed for configuring and managing a remote presentation session server farm. In an example embodiment, a central management server (CMS) receives a task to be carried out on a server farm (e.g. make an otherwise unused server operate as a remote presentation session server). The CMS then validates this request against a model of allowed tasks, and the current configuration of the server farm. Once validated, the CMS converts the task into operations to be carried out by one or more servers of the server farm. The CMS then sends these operations to the respective servers, where the operations are received by an agent process executing on the server. Each agent performs the received operations on the server upon which it executes, and sends an indication of whether the operations were completed successfully to the CMS. The CMS may then update its model and current configuration to reflect the current configuration of the server farm.

20 Claims, 4 Drawing Sheets

OTHER PUBLICATIONS

"Deploying Remote Desktop Licensing Step-by-Step Guide," *Microsoft Corporation*, Jun. 15, 2009, 3 pgs, downloaded Jan. 8, 2010, http://technet.microsoft.com/en-us/library/dd983943(WS.10).aspx.

"Windows Server 2008 R2 Remote Desktop Services," *Microsoft*, Retrieved Dec. 17, 2009, 2 pgs, downloaded Jan. 8, 2010, http://download.microsoft.com/download/5/B/D/5BD5C253-4259-428B-A3E4-1F9C3D803074/Datasheet%20WS08R2_RDS_RC.docx.

"Apple Remote Desktop 3," Retrieved Dec. 17, 2009, 1 page, downloaded Jan. 8, 2010, http://www.apple.com/remotedesktop/remoteadministration.html.

\* cited by examiner

CENTRALIZED MANAGEMENT TOOL FOR REMOTE PRESENTATION SESSION SERVER FARMS

BACKGROUND OF THE INVENTION

Although computers were once isolated and had minimal or little interaction with other computers, computers now interact with a wide variety of other computers through Local Area Networks (LANs), Wide Area Networks (WANs), dial-up connections, and the like. With the wide-spread growth of the Internet, connectivity between computers has become more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as remote presentation systems, which can use protocols such as Remote Desktop Protocol (RDP), Independent Computing Architecture (ICA), and others to share a desktop and other applications with a remote client. Such computing systems typically transmit the keyboard presses and mouse clicks or selections from a client computing device to a server computing device, relaying the screen updates back in the other direction over a communications network (e.g., the INTERNET™). As such, the user has the experience as if his session is being executed entirely on his client computer when in reality the client is only sent screenshots, or frames, of the applications as they appear on the server side.

In an environment where many remote presentation sessions are to be served concurrently, such as for a large corporation, these remote presentation sessions may be served by a grouped plurality of servers, commonly referred to as a server farm. The servers may perform different role services (for instance, one server may function as a connection broker that assigns incoming remote presentation session requests to other servers that serve remote presentation sessions). Current techniques for managing such server farms require an administrator to configure and manage multiple roles that span a plurality of physical servers. This is a time consuming process, and one that requires an administrator to have a deep understanding of the various roles of the server farm, and associated dependencies.

SUMMARY OF THE INVENTION

It would therefore be an improvement over the prior art to provide improved techniques for configuring and managing a remote presentation session server farm. Methods, systems, and computer-readable storage media are disclosed for these techniques.

These present techniques incorporate the use of logical tasks rather than the aforementioned roles. A task may comprise, for instance, adding a new virtualization host server to the pool of available virtualization host servers in the server farm. Such a task is usually a term in which an administrator thinks, as opposed to the corresponding changes that must be made to various role services to implement such a task. In using a task-based paradigm, the often complex interaction and dependencies between different role services is hidden from an administrator as he manages a remote presentation session deployment as a single entity and from a single management point.

A task may be broader than the above. A task may comprise an operation of creating a remote presentation session server farm. Upon being provided with some parameters for this task, such as the computers to be included in the remote presentation session server farm, the task is then executed to produce the desired result.

In an example embodiment, a central management server (CMS) receives a task to be carried out on a server farm (e.g. make an otherwise unused server operate as a remote presentation session server). The CMS then validates this request against a model of allowed tasks, and the current configuration of the server farm. Once validated, the CMS converts the task into operations to be carried out by one or more servers of the server farm. The CMS then sends these operations to the respective servers, where the operations are received by an agent process executing on the server. Each agent performs the received operations on the server upon which it executes, and sends an indication of whether the operations were completed successfully to the CMS. The CMS may then update its model and current configuration to reflect the current configuration of the server farm.

The primary embodiment considered herein involves a remote presentation server farm. The use of a remote presentation session server farm is for illustrative purposes, and it may be appreciated that these techniques may be applied to a server farm comprising some heterogeneous group of servers—servers that do not all perform the same role.

The primary embodiments described herein discuss computer-executable instructions executed by one or more processors of a computing device. However, it may be appreciated that these techniques may be implemented entirely in terms of hardware, such as through appropriately programming field-programmable gate arrays (FPGAs), or some combination thereof. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for configuring and managing a remote presentation session server farm are further described with reference to the accompanying drawings in which.

DETAILED DESCRIPTION OF ILLUSTRATIVE EMBODIMENTS

Figure 1:
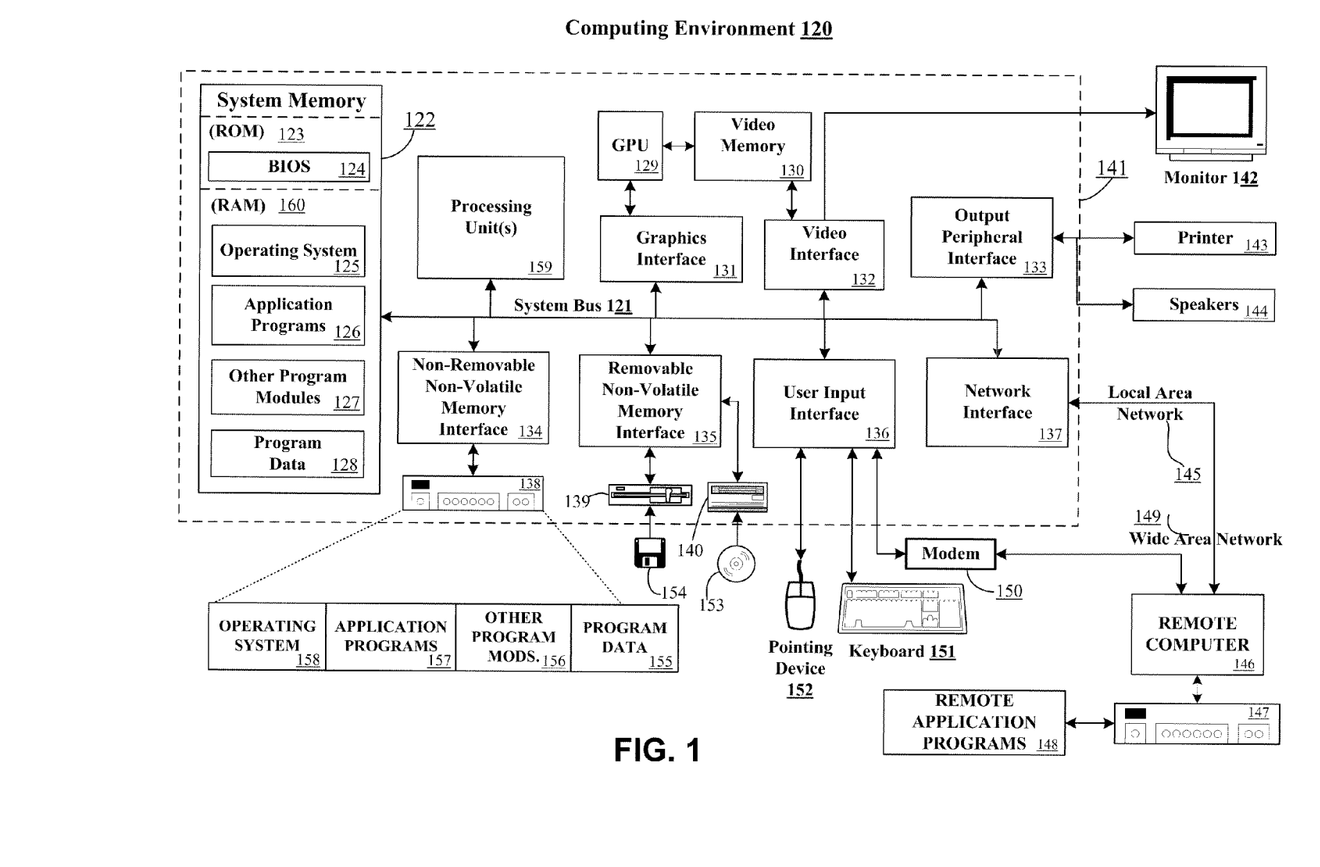
FIG. 1 illustrates an example general purpose computing environment in which the techniques described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the example operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer-readable media. Computer-readable media can be any available media that can be accessed by computer 141 and includes both volatile and nonvolatile media, removable and non-removable media. The system memory 122 includes computer-readable storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 1 illustrates operating system 125, application programs 126, other program modules 127, and program data 128.

The computer 141 may also include other removable/non-removable, volatile/nonvolatile computer storage media. By way of example only, FIG. 1 illustrates a hard disk drive 138 that reads from or writes to non-removable, nonvolatile magnetic media, a magnetic disk drive 139 that reads from or writes to a removable, nonvolatile magnetic disk 154, and an optical disk drive 140 that reads from or writes to a removable, nonvolatile optical disk 153 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 140 are typically connected to the system bus 121 by a removable memory interface, such as interface 135.

The drives and their associated computer storage media discussed above and illustrated in FIG. 1, provide storage of computer-readable instructions, data structures, program modules and other data for the computer 141. In FIG. 1, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 1. The logical connections depicted in FIG. 1 include a local area network (LAN) 145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 150 or other means for establishing communications over the WAN 149, such as the Internet. The modem 150, which may be internal or external, may be connected to the system bus 121 via the user input interface 136, or other appropriate mechanism. In a networked environment, program modules depicted relative to the computer 141, or portions thereof, may be stored in the remote memory storage device. By way of example, and not limitation, FIG. 1 illustrates remote application programs 148 as residing on memory device 147. It will be appreciated that the network connections shown are example and other means of establishing a communications link between the computers may be used.

Figure 2:
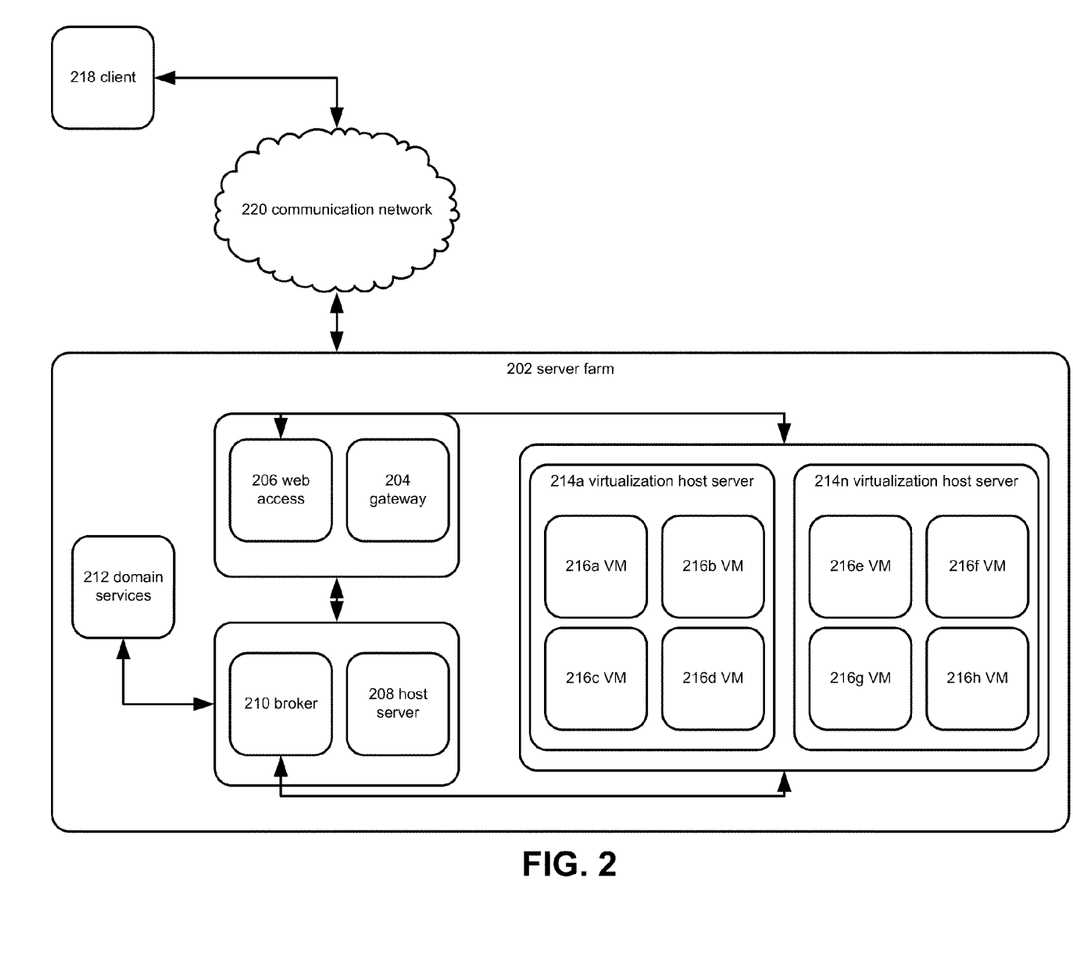
FIG. 2 illustrates an example remote presentation session server farm implemented through role services.

FIG. 2 illustrates an example remote presentation session server farm implemented through role services.

Remote presentation server farm 202 comprises a plurality of role services. These services may be implemented on one or more computers. For instance, each service may be implemented on a single computer, with or without the use of virtual machines to separate one or more roles, or the services may be apportioned among a plurality of computers. Further, more than one computer or virtual machine may perform the same role. For instance, remote presentation virtualization host server role 214 may be performed by a plurality of computers (hence a remote session connection broker role 210 that brokers a connection between a client and one of a plurality of server roles as selected by connection broker role, such as based on the respective load of the server roles).

Remote presentation server farm 202 may comprise remote presentation gateway role 204, remote presentation web access role 206, remote presentation session host server role 208, remote session connection broker role 210, domain services role 212, remote presentation virtualization host server role 214, and virtual machines 216.

Remote presentation gateway role 204 enables a client computer 218 to connect to a remote presentation session of remote presentation server farm 202 over a communication network 220. Remote presentation web access role 206 publishes virtual desktop to clients using a web interface to conduct a remote presentation session. Remote presentation session host server role 208 redirects clients to virtual machines. Remote session connection broker role 210 enumerates and orchestrates virtual machines. Domain services role 212 stores users assignments to personal virtual desktops. Remote presentation virtualization host server role 214 hosts personal virtual desktops and virtual desktop pools using a virtual machine manager (VMM). Virtual machines 216 are managed by the VMM and provide an environment in which virtual desktops execute.

To connect to a remote presentation session of remote presentation server farm 202, client 218 may log in to a web page served by remote desktop web access role 206 using the Hyper Text Transfer Protocol Secure ("HTTPS") protocol. Remote desktop web access role 206 queries remote session connection broker role 210 to retrieve a list of virtual desktops to be displayed by client 218. A user of client 218 may select the virtual desktop he wishes to use, and an indication of that virtual desktop is sent to remote session gateway role 204 via HTTPS. Remote session gateway role 204 forwards this connection to remote session host server role 208. Remote session host server role 208 is running in redirection mode and requests remote session connection broker role 210 to orchestrate a virtual machine for client 218 and return the Internet Protocol ("IP") address of the virtual machine. Remote presentation session host server role 208 sends a redirection packet to client 218 via remote session gateway 204.

Remote session connection broker role 210 queries domain services role 212 to retrieve the personal virtual desktop for client 218. In an embodiment where it is implemented with a MICROSOFT WINDOWS® operating system, domain services role 212 may be an ACTIVE DIRECTORY® domain services role. Remote session connection broker 210 orchestrates the virtual machine and returns to IP address to remote session host server role 208. Client 218 connects directly to the virtual machine through remote session gateway 204.

Figure 3:
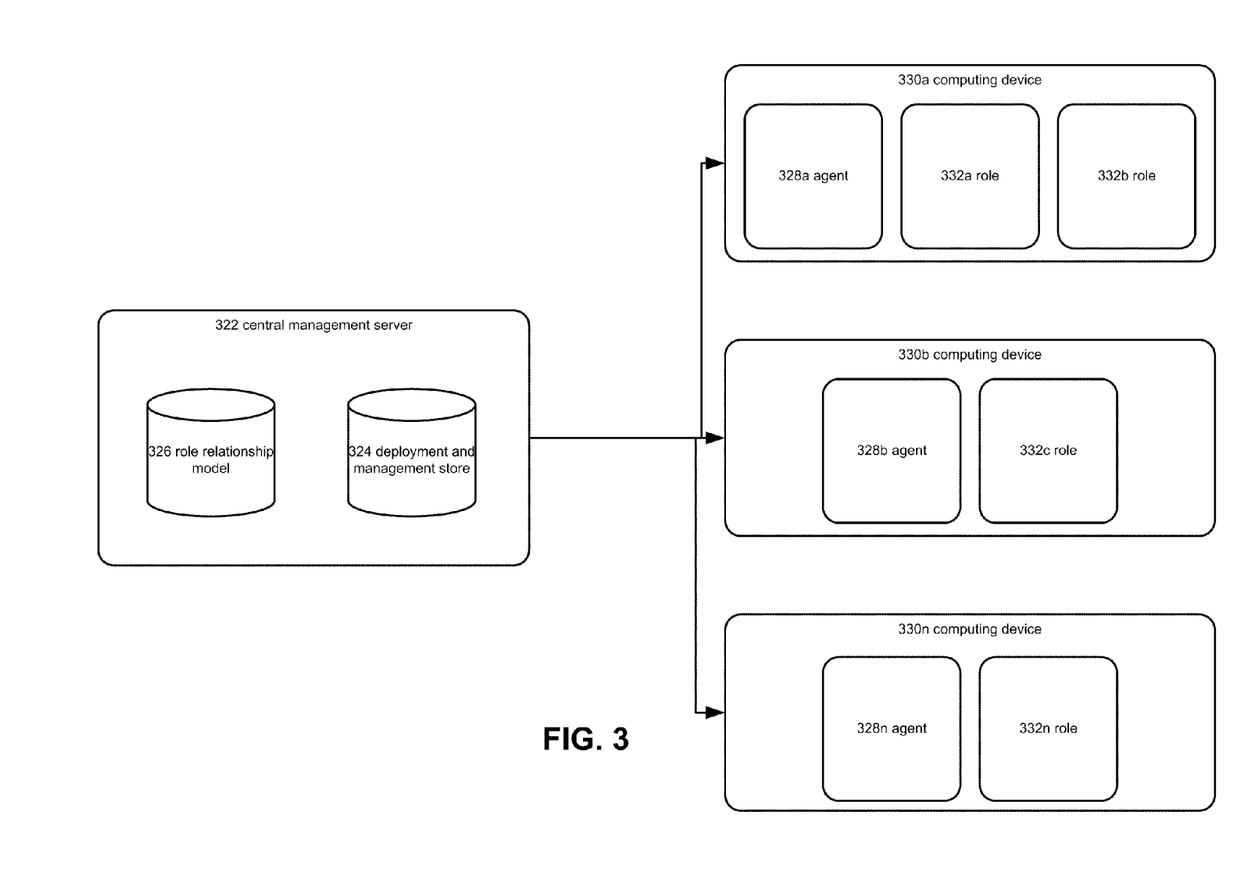
FIG. 3 illustrates an example remote presentation session server farm with task-based management.

FIG. 3 illustrates an example remote presentation session server farm with task-based management.

Central management server 322 comprises deployment and management data store 324 and role relationship model 326.

Deployment and management data store 324 comprises a model of the current deployment—for example, this may include the number and identity of roles that exist in the current deployment, as well as other available computing resources (e.g. an additional physical computing device, or an additional virtual machine that may be executed on a physical computing device that is currently part of the deployment) that are available to be incorporated into the deployment. Deployment and management data store 324 may also comprise required information for managing the deployment.

Role relationship model 326 comprises a model of relationships and dependencies between the roles of the session server farm—for example, adding a new virtualization host server to the server farm not only requires configuring this new virtualization host server, but also configuring a remote session connection broker role so that this remote session connection broker is aware of the new virtualization host server and may redirect incoming client remote presentation session requests to this new virtualization host server.

Deployment and management data store 324 and role relationship model 326 may be implemented, for example, as computer-executable instructions in a memory or a database, where central management server 322 comprises a computing device.

Central management server 322 may be communicatively coupled with an agent 328 resident on the computing device 330 that executes each role (e.g. remote session connection broker role 210, and/or domain services role 212) of a remote presentation session server farm, such as the remote presentation session server farm depicted in FIG. 2. Where each role on a computing device 330 is executed within a separate virtual machine, an agent 328 may execute within each of those separate virtual machines to communicate with the respective role. Where each role is executed outside of a virtual machine, such as on computing device 330 itself, there may be a single agent 328 executing on computing device 330 that communicates with each role.

Agent 328 may communicate with each role on agent 328's computing device 330, such as through extensible markup language (XML) contained within remote procedure calls (RPCs), to instruct a role to perform various tasks. A role may have an application programming interface (API) exposed that allows other computing devices or processes to call those APIs to control the management of the role. For instance, connection broker role may have an API that allows a computing device to instruct connection broker role that there is an additional virtualization host server that it may now redirect remote presentation session to this additional virtualization host server. These APIs may be called by agent 328.

With this central management server 322, instead of configuring a specific role in a particular server, a particular task may be configured and managed. This may be effected through a task-based user-interface management tool that communicates with central management server 322 through an exposed interface. Central management server 322 decodes the task, enforces the dependencies or constraints, and resolves the task to a set of sub tasks that are specifically targeted to other servers hosting the role services. These services are intimated so that a set of tasks are executed. Agents residing on these servers receive the request and execute a set of local API calls in a specific sequence to produce the desired task.

Figure 4:
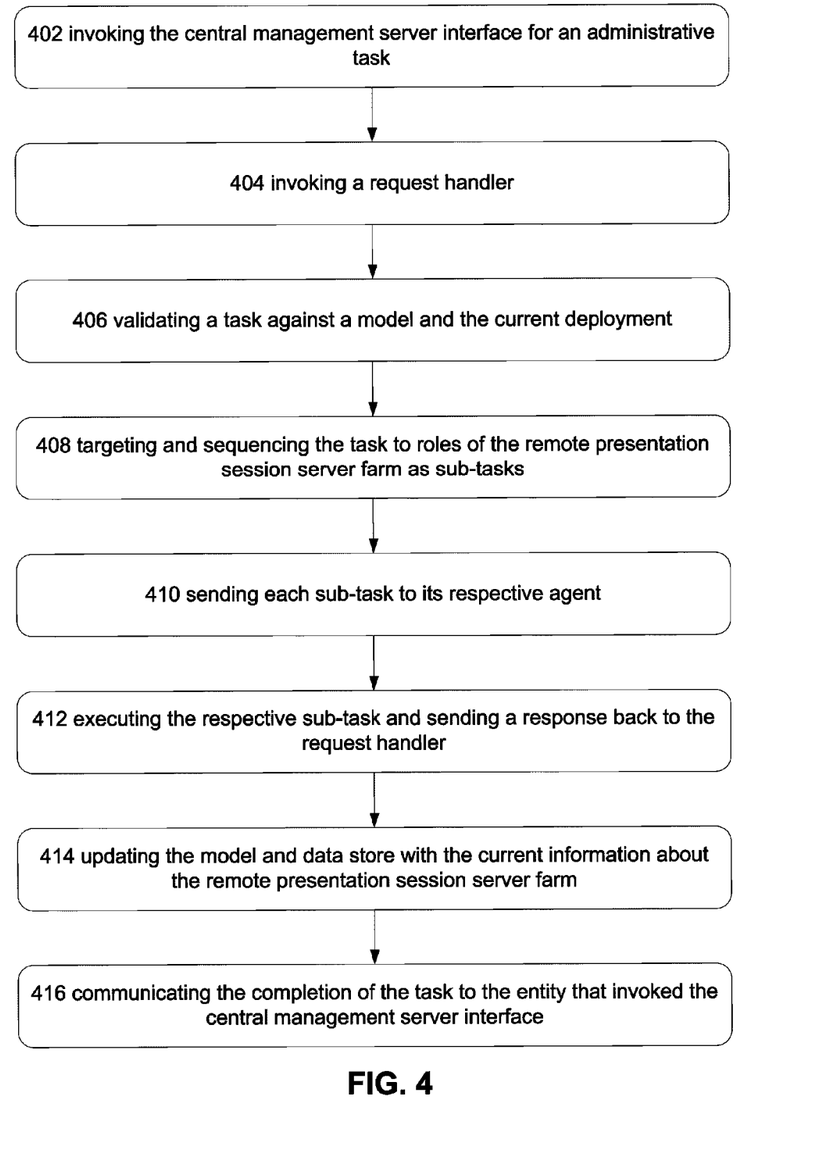
FIG. 4 illustrates an example signal flow among components of a remote presentation session server farm with task-based management.

FIG. 4 illustrates an example signal flow among components of a remote presentation session server farm with task-based management.

This remote presentation session server farm with task-based management may be, for instance, the remote presentation session server farm with task-based management depicted in FIG. 3.

Operation 402 depicts receiving an indication of a task to perform on the server farm, the task corresponding to a first role of the server farm. This may comprise invoking the central management server interface for an administrative task. For instance, an indication of a task to be performed for the remote presentation session server farm may be received by an administrator's computing device during a period of administrator maintenance on the remote presentation session server farm. Additionally, the central management server interface may directly accept an indication of a task, such as from a console of the central management server.

The first role may comprise, for instance, a remote presentation gateway role, a remote presentation web access role, a remote presentation session host server role, a remote session connection broker role, a domain services role, or a remote presentation virtualization host server role.

Operation 404 depicts the central management server interface invoking a request handler. The request handler may be a process executing on the central management server that communicates with the central management server interface, and performs tasks indicated to the central management server interface.

Operation 406 depicts determining that the task is valid. This may comprise determining that the task is valid based on a model of tasks and/or determining that the task is valid based on a current configuration of the server farm.

In an embodiment, operation 406 may comprise the request handler validating a task against a model and the current deployment.

Operation 406 may further comprise determining a dependency of the task based on a model of tasks; determining that the first sequence is to be performed prior to when the second sequence is to be performed based on the dependency; and wherein instructing the computer corresponding to the second role to perform the second sequence of actions further comprises: instructing the computer corresponding to the second role to perform the second sequence of actions upon determining that the computer corresponding to the first role has performed the first sequence of actions.

This may comprise determining any dependencies involved in performing the task, such that to add a virtualization host server to the server farm also requires configuring a connection broker role to be aware of this new virtualization host server. This may also comprise identifying specific existing roles in the current deployment covered by these dependencies. For instance, it may comprise identifying the two connection broker roles that exist in the current deployment that would need to be configured as above.

Operation 408 depicts determining a first sequence of actions to perform on the first role, the first sequence corresponding to the task. In an embodiment, this may include determining a second sequence of actions to perform on the second role, the second sequence corresponding to the task.

This may comprise targeting and sequencing the task to roles of the remote presentation session server farm as one or more sub-tasks (alternately referred to as "a sequence of actions"). For instance, where the task involves adding a virtualization host server to the server farm, one sub-task may comprise configuring the virtualization host server role on this new virtualization host server, and a second sub-task may comprise configuring the connection broker role to be aware of this new virtualization host server role so that it is configured to send new remote presentation sessions to it. In dividing the task into these sub-tasks, the task is sequenced to its respective roles.

Further, it may be that the sequence that the sub-tasks are performed in is important. For instance, it may be in a server farm that a connection broker role cannot be configured to be made aware of a new virtualization host server role unless that new virtualization host server role first exists. In such a situation, configuring the new virtualization host server role must be performed prior to configuring the connection broker role, so the sub-tasks will be sequenced such that the configuring the new virtualization host server role sub-task is performed prior to the configuring the connection broker role sub-task.

Operation 410 depicts instructing a computer corresponding to the first role to perform the first sequence of actions. In an embodiment, operation 410 includes instructing a computer corresponding to the second role to perform the second sequence of actions.

This may comprise sending an indication of the first sequence of actions to an agent executed on the computer corresponding to the first role. In an embodiment, the first sequence of actions comprises an API call to an API corresponding to the first role. In an embodiment, the first role is executed within a guest partition of the computer corresponding to the first role, and the agent is executed within a host partition of the computer corresponding to the first role.

This may comprise sending each sub-task to its respective agent. Where the central management server and the respective agents are communicatively coupled across a communications network, such as an intranet, this may comprise sending an indication of each sub-task to the respective agent across this communications network.

Operation 412 depicts the each agent executing the respective sub-task and sending a response back to the request handler. An agent may execute a sub-task by performing a series of API calls to the corresponding role service as described above. In an embodiment, the agent is sent an indication of which API calls to make to the corresponding role service. In another embodiment, the agent is sent a more general indication of the sub-task to be performed, and from this indication of a sub-task to be performed, determines one or more API calls to make to the corresponding role service, and does so. Upon completing an attempt to perform the sub-task, the agent may send a status response back to the request handler. This may comprise an indication that the sub-task was successfully executed, or an indication that there was an error in executing the sub-task, along with, optionally, an indication of the specific nature of the error. For instance, performing the sub-task may require changing four settings for the role service, and only two were able to be changed. The status response may indicate the two settings that were changed, and the two settings that were not changed.

Operation 414 depicts updating an indication of a current configuration of the server farm based on the first sequence of actions. This may comprise updating the model and data store with the current information about the remote presentation session server farm. This may comprise the current configuration of the remote presentation session server farm, regardless of whether each sub-task above was successfully executed. For instance, if a new virtualization host server role was configured, but the connection broker role was not successfully configured to be aware of this new virtualization host server role, the model is updated to reflect this reality.

Operation 416 depicts communicating the completion of the task to the entity that invoked the central management server interface. This may comprise an indication that the request was successfully carried out, or that some error occurred while attempting to carry out the request, and, optionally, information identifying the error.

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for configuring a plurality of heterogeneous roles of a server farm, comprising:
    receiving, by one or more computers, an indication of a task to perform on the server farm, the task corresponding to a first role of the server farm and a second role of the server farm, the first role differing from the second role;
    determining, by the one or more computers, that the server farm is configured to perform the task based on a current configuration of the server farm, the configuration comprising a model of a relationship between the first role and the second role;
    determining, by the one or more computers, based on the task a first sequence of actions to perform on the first role;
    determining, by the one or more computers, based on the task a second sequence of actions to perform on the second role;
    sending, by the one or more computers, an indication to the first role to perform the first sequence of actions; and
    sending, by the one or more computers, an indication to the second role to perform the second sequence of actions.

2. The method of claim 1, further comprising:
    determining a dependency of the task based on a model of tasks;
    determining that the first sequence is to be performed prior to when the second sequence is to be performed based on the dependency; and
    wherein instructing the computer corresponding to the second role to perform the second sequence of actions further comprises:
        instructing the computer corresponding to the second role to perform the second sequence of actions upon determining that the computer corresponding to the first role has performed the first sequence of actions.

3. The method of claim 1, wherein the first role and the second role execute on a first computer,
    wherein instructing the computer corresponding to the first role to perform the first sequence of actions further comprises: sending an indication of the first sequence of actions to an agent executed on the computer corresponding to the first role,
    wherein instructing the computer corresponding to the second role to perform the second sequence of actions further comprises: sending an indication of the second sequence of actions to a second agent executed on the computer corresponding to the second role,
    wherein the first role is executed within a first guest partition, the agent is executed within a host partition of the computer corresponding to the first role, and
    wherein the second role is executed within a second guest partition, and the second agent is executed within a host partition of the computer corresponding to the second role.

4. The method of claim 1, wherein the first role executes on a first computer and the second role executes on a second computer.

5. The method of claim 1, further comprising:
    determining that the task is valid.

6. The method of claim 5, wherein determining that the task is valid comprises:
    determining that the task is valid based on a model of tasks.

7. The method of claim 1, wherein instructing the computer corresponding to the first role to perform the first sequence of actions further comprises:
    sending an indication of the first sequence of actions to an agent executed on the computer corresponding to the first role.

8. The method of claim 1, wherein server farm comprises a remote presentation session server farm, and the first role comprises a remote presentation gateway role, a remote presentation web access role, a remote presentation session host server role, a remote session connection broker role, a domain services role, or a remote presentation virtualization host server role.

9. The method of claim 1, further comprising:
    updating an indication of a current configuration of the server farm based on the first sequence of actions.

10. The method of claim 1, wherein the first sequence of actions comprises:
    an application programming interface (API) call to an API corresponding to the first role.

11. A system for configuring a plurality of heterogeneous roles of a server farm, comprising:
    a processor; and
    a memory communicatively coupled to the processor bearing instructions that, upon execution by the processor, cause the system to at least:
        receive an indication of a task to perform on the server farm, the task corresponding to a first role of the server farm;
        determine that the server farm is configured to perform the task based on a current configuration of the server farm, the configuration comprising a model of a relationship between the first role and the second role;
        determine a first sequence of actions to perform on the first role, the first sequence corresponding to the task; and
        instruct a computer corresponding to the first role to perform the first sequence of actions.

12. The system of claim 11, wherein the memory further bears instructions that, when executed by the processor, cause the system to at least:
    determine a second sequence of actions to perform on the second role, the second sequence corresponding to the task; and
    instruct a computer corresponding to the second role to perform the second sequence of actions.

13. The system of claim 12, wherein the memory further bears instructions that, when executed by the processor, cause the system to at least:
    determine a dependency of the task based on a model of tasks;
    determine that the first sequence is to be performed prior to when the second sequence is to be performed based on the dependency; and wherein the instructions that when executed on the processor, cause the system to at least instruct the computer corresponding to the second role to perform the second sequence of actions further cause the system to at least:
  instruct the computer corresponding to the second role to perform the second sequence of actions upon determining that the computer corresponding to the first role has performed the first sequence of actions.

14. The system of claim 11, wherein the memory further bears instructions that, when executed by the processor, cause the system to at least:
  update an indication of a current configuration of the server farm based on the first sequence of actions.

15. The system of claim 11, wherein the memory further bears instructions that, when executed by the processor, cause the system to at least:
  determine that the task is valid.

16. The system of claim 15, wherein the memory further bears instructions that, when executed by the processor, cause the system to at least:
  determine that the task is valid based on a model of tasks.

17. A computer-readable storage medium bearing computer-readable instructions method for configuring a plurality of heterogeneous roles of a server farm that, upon execution on a computer, cause the computer to perform one or more operations comprising:
  receiving an indication of a task to perform on the server farm, the task corresponding to a first role of the server farm;
  determine that the server farm is configured to perform the task based on a current configuration of the server farm, the configuration comprising a model of a relationship between the first role and the second role;
  determining a first sequence of actions to perform on the first role, the first sequence corresponding to the task; and
  instructing a computer corresponding to the first role to perform the first sequence of actions.

18. The computer-readable storage medium of claim 17, wherein instructing the computer corresponding to the first role to perform the first sequence of actions further comprises:
  sending an indication of the first sequence of actions to an agent executed on the computer corresponding to the first role.

19. The computer-readable storage medium of claim 17, further bearing computer-readable instructions that, upon execution on the computer, cause the computer to perform one or more operations comprising:
  determining that the task is valid.

20. The computer-readable storage medium of claim 19, wherein determining that the task is valid comprises:
  determining that the task is valid based on a model of tasks.

* * * * *